UNIVERSAL TONE ARM FOR MULTISPEED RECORD PLAYERS
Filed Nov. 26, 1948 3 Sheets-Sheet 1
FIG. 1.
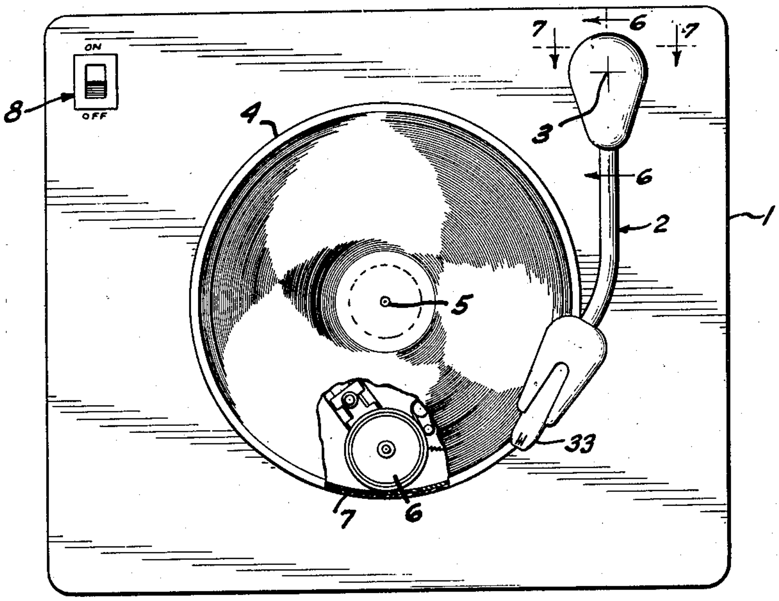
FIG. 3.
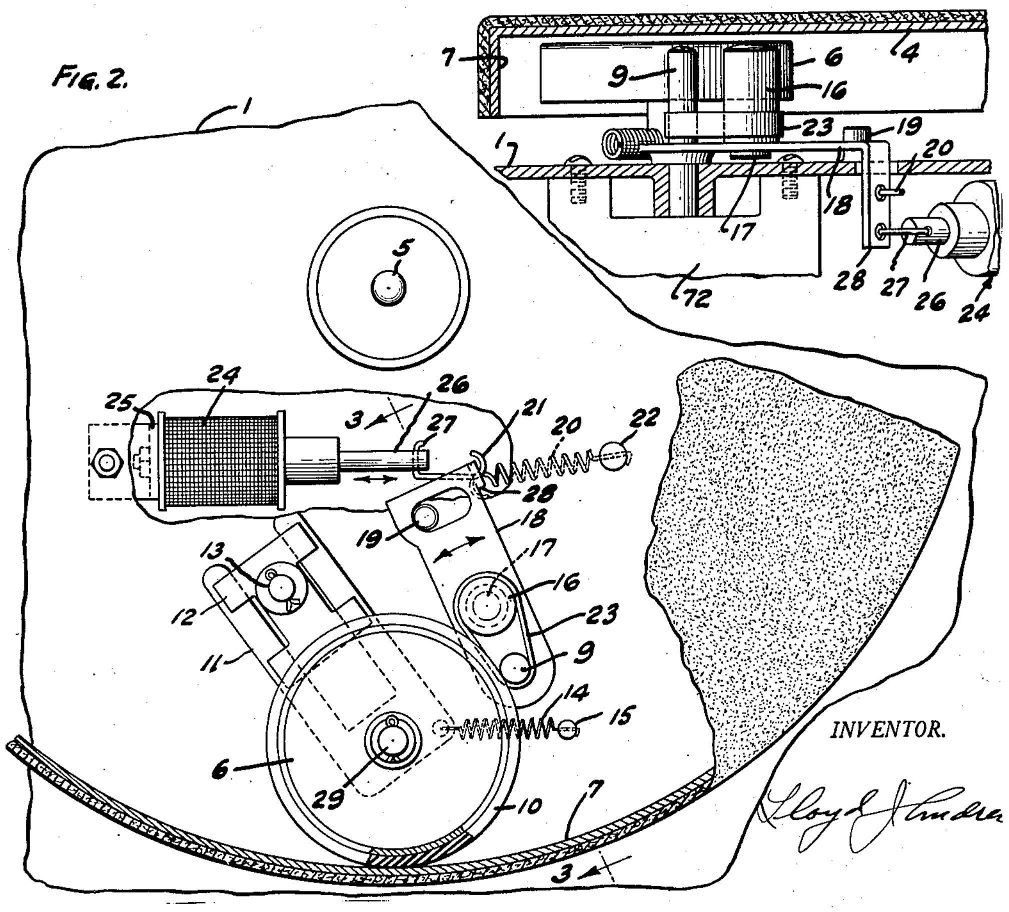
FIG. 2. FIG. 3.
INVENTOR.

UNIVERSAL TONE ARM FOR MULTISPEED RECORD PLAYERS

INVENTOR.

Lloyd J. Andres

Oct. 17, 1950 L. J. ANDRES 2,526,188

UNIVERSAL TONE ARM FOR MULTISPEED RECORD PLAYERS

Filed Nov. 26, 1948 3 Sheets-Sheet 3

INVENTOR.

Lloyd J. Andres

UNITED STATES PATENT OFFICE 2,526,188

UNIVERSAL TONE ARM FOR MULTISPEED RECORD PLAYERS

Lloyd J. Andres, Chicago, Ill., assignor to Permo, Incorporated, Chicago, Ill., a corporation of Illinois Application November 26, 1948, Serial No. 62,090

5 Claims. (Cl. 179—100.41)

This invention relates in general to phonographs and more particularly to the combination of a phonograph turntable and tone arm for playing two types of disc records.

The ordinary commercial type of disc record is intended to be rotated at approximately seventy-eight revolutions per minute and played with a stylus having a point radius of approximately three mils and a vertical needle pressure in the order of one ounce. Recently long playing disc records have become available commercially which require a rotation of thirty-three and one-third revolutions per minute and a stylus point radius of approximately one mil and a vertical needle pressure in the order of one-fifth of an ounce.

This invention provides means whereby the manual inversion of the pick-up cartridge automatically controls the turntable speed, positions the proper stylus point for engagement with the record and provides a corresponding proper vertical needle pressure for playing either of the previously mentioned two types of records and comprises a principal object of the invention.

A further object of the invention is the provision of a two-speed drive for a turntable responsive to an electric circuit controlled by the position of the pick-up cartridge in the tone arm.

Another object of the invention is a tone arm having a spring suspension therein to provide two predetermined needle pressures controlled by the positioning of the pick-up cartridge.

Another object of the invention is an adjustable spring suspension means in said tone arm for providing a predetermined needle pressure.

A further object of the invention is the provision of a damped diaphragm means for supporting the tone arm and reducing sustained vibration therein.

A further object of the invention is the provision of an electric switch and circuit means responsive to the position of the cartridge in the tone arm for controlling the speed of a turntable drive.

These and other advantages in one embodiment of the invention are shown and described in the appended drawings and specification.

Fig. 1 is a reduced size plan view of a record player.

Fig. 2 is a fragmentary plan view of the turntable drive shown in Fig. 1.

Fig. 3 is a fragmentary cross-sectional elevation taken through section line 3—3, Fig. 2.

Figures 4, 5, 6, 7:
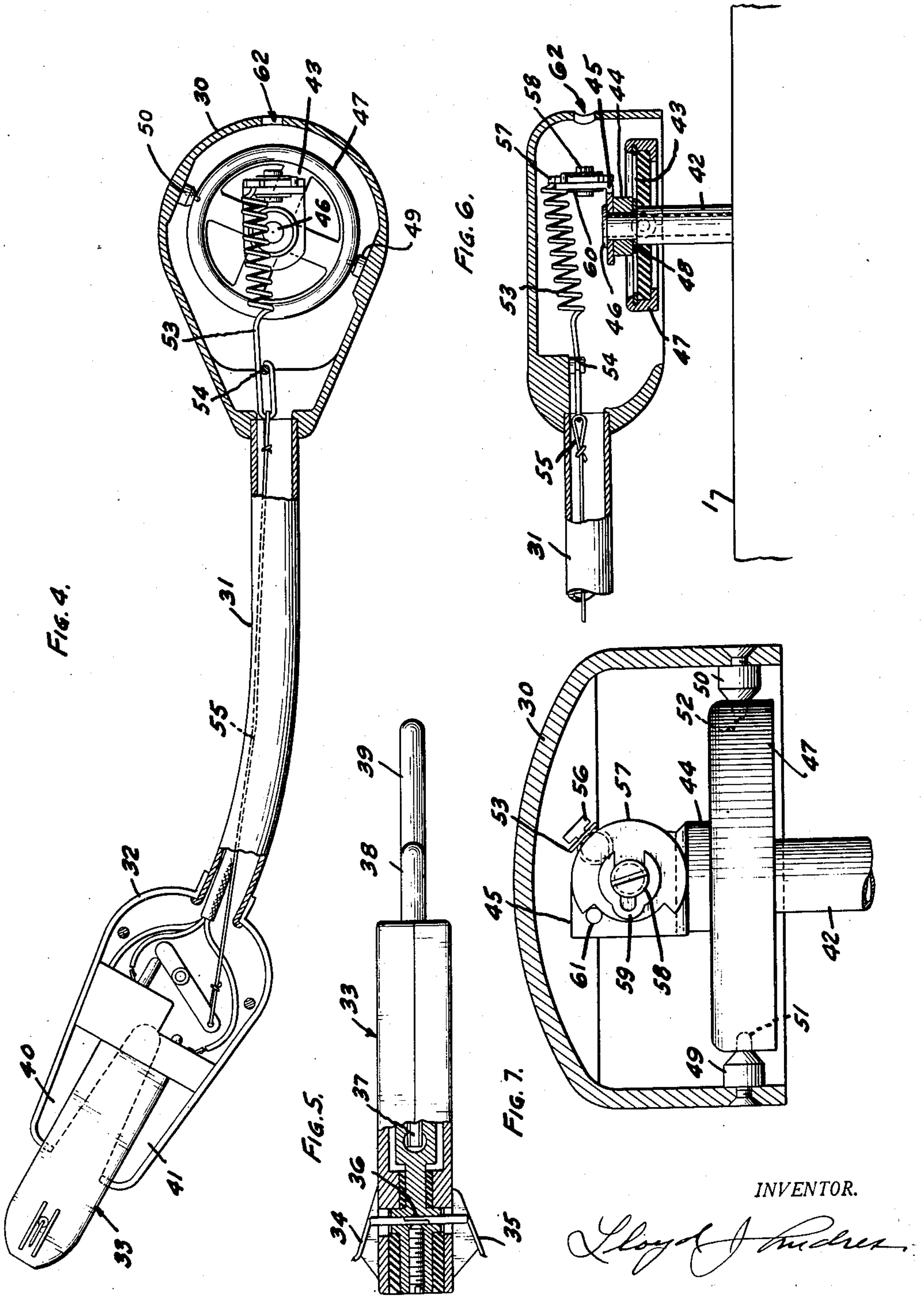
Fig. 4 is a transverse cross-sectional plan view of the tone arm shown Fig. 1.
Fig. 5 is an enlarged side view of the pick-up cartridge shown in the tone arm Fig. 4 with a portion cut away.
Fig. 6 is a cross-sectional view of the tone arm taken through section line 6—6, Fig. 1.
Fig. 7 is an enlarged cross-sectional view of the tone arm taken through section line 7—7, Fig. 1.

Referring to Fig. 1, a mounting plate 1 serves as a support for the entire apparatus, a tone arm 2 is pivotally mounted to plate 1 for horizontal movement about vertical axis 3, a conventional turntable 4 is journaled for rotation about its axis 5 and is driven by idler wheel 6 in contact with the inner periphery of the turntable rim 7 when rotated by electric motor to be hereinafter described, which motor is controlled by on-off switch 8.

Referring to Fig. 2 a drive means is employed for rotating the turntable at two predetermined speeds including a motor drive shaft 9, which normally engages the rubber rim 10 of the idler wheel 6 for transmitting a predetermined high speed rotation to the turntable. The idler wheel 6 is journaled on stud 29, which stud is secured in a plate 11 slidably positioned in a guide member 12, which member is pivotally secured to the plate 1 on stud 13. A spring 14 having its ends secured to plate 11 and fixed stud 15 respectively normally urges the idler wheel 6 into driving contact with the shaft 9 and the turntable rim 7. Thus it is apparent that when the motor shaft 9 rotates at a constant predetermined speed the turntable will revolve in a clockwise direction at a constant predetermined reduced speed determined by the ratio of diameter of the drive shaft to the diameter of the turntable rim. In order to drive the turntable at a predetermined lower speed a reduction pulley 16 is journaled about a stud 17, which stud is secured in a movable lever 18, which lever is adapted for predetermined movement, as shown by arrow, about the axis of the drive shaft 9 within the limits of a stop stud 19 as shown secured to plate 1. A spring 20 secured at one end to an ear 21 of lever 18 and at its opposite end to fixed stud 22 normally urges the lever 18 into the position shown. A resilient flat belt 23 around drive shaft 9 and reduction pulley 16, better shown Fig. 3, provides the desired speed reduction ratio for driving the turntable at the aforementioned predetermined low speed. An electro-magnet 24 is secured to plate 1 by bracket 25 and is provided with a plunger 26 adapted for movement in direction shown by arrow. A link 27 is pivotally connected to the end of plunger 26 and a downward extension 28 of lever 18, better shown Fig. 3.

It is now apparent that when electro-magnet 24 is energized its plunger 26 will move the lever 18 against the restraining action of spring 20 and thereby bring the reduction pulley 16 into contact with the rim 10 of idler wheel 6 and move idler wheel 6 sufficiently far against the restraining action of spring 14 to disengage its peripheral contact with drive shaft 9. Since the idler wheel is free to move in a path concentric with the turntable, the turntable will be driven at a speed governed by the ratio of diameters of the drive shaft 9 and the reduction pulley 16.

When the magnet 24 is de-energized the drive elements will assume the position shown in Fig. 2 by virtue of the tension in the springs 14 and 20.

Referring to Fig. 4, the tone arm 2 shown Fig. 1 comprises a rigid assembly of rear housing 30, a tubular member 31 and a pick-up cartridge housing 32. The pick-up cartridge 33 is provided with a symmetrical outer contour and is adapted to be manually withdrawn from the housing 32, rotated 180 degrees and reinserted. It is important that the forked ends 40 and 41 of the housing be constructed to provide a predetermined pressure inward towards the principal axis of the cartridge sufficient to hold the cartridge in place.

Although the pick-up cartridge may be any one of several wellknown types, a crystal type is illustrated in Fig. 5 and clearly shows the symmetrical character of the housing and the use of an upper needle 34 having a tip adapted to engage a particular record groove and a lower needle 35 having a tip adapted to engage a different type record groove. Both needles are secured in chuck member 36, which is adapted to apply a twisting motion to the crystal element 37 when either of the needles is in engagement with a moving record. The internal electrical connections of the crystal element 37 are connected to terminal contacts 38 and 39 respectively, the contact 39 having greater length for the purposes to be hereinafter described.

Referring to Fig. 6, a vertical tubular spindle 42 is journaled for rotation in plate 1 by means not shown and serves as a support for the entire tone arm.

Referring to Figs. 4 and 6, the spindle assembly comprises a resilient diaphragm 43 having a hole in its center resting against a shoulder around the spindle, a bushing 44 and a bracket 45 thereon, with the riveted end 46 of the spindle holding said elements in rigid relation with each other. The outer edge of the diaphragm is rigidly secured in a groove in an annulus 47 as shown. A damping washer 48 is secured in a lower groove in the annulus in contact with the lower surface of the diaphragm 43. The diaphragm's resistance to stress in predetermined directions may be altered by the strategic placement of apertures therein.

Referring to Figs. 4 and 7, the tone arm 2 is journaled for vertical movement about pivots 49 and 50 positioned in the rear housing 30 for engagement with corresponding cavities 51 and 52 in the annulus 47.

The damping disc 48 is preferably made from

"Viscoloid" or similar damping material and is used to prevent sustained oscillation in the diaphragm which in turn prevents undesirable self-oscillation of the tone-arm during the playing of a record.

A sprling system for counter-balancing the tone arm is positioned in the rear housing 30, Figs. 4, 6 and 7, consisting of coiled spring 53 guided at its forward end by a grooved stud 54 secured in the housing and retained by a cord 55. The opposite end of the spring 53 is attached to a tongue 56 of a disc 57, which disc is keyed to a stud 58. The stud is rotatably retained in bracket 45 by the spring washers 59 and 60. A stop pin 61 secured in bracket 45 is provided to engage two abutments in disc 57 thus preventing the disc 57 being moved beyond a normal range of adjustment. It is now apparent that when the stud 58 is rotated a sensitive adjustment of vertical needle pressure can be attained by virtue of the change of leverage in the point of application of the rear end of the spring 53 with the axis of vertical movement of the tone arm through pivots 59 and 50. An aperture 62 is provided in the rear of the housing 30 for entry by a screw driver for convenient adjustment of the stud 58.

When the disc 57 is positioned as shown in Fig. 7, the spring 53 will exert its maximum counter-balancing effect on the tone arm and hence the minimum needle pressure. When the disc is rotated clockwise the counter-balancing effect is adjustably minimized and a corresponding increase in needle pressure will result.

Figure 8:
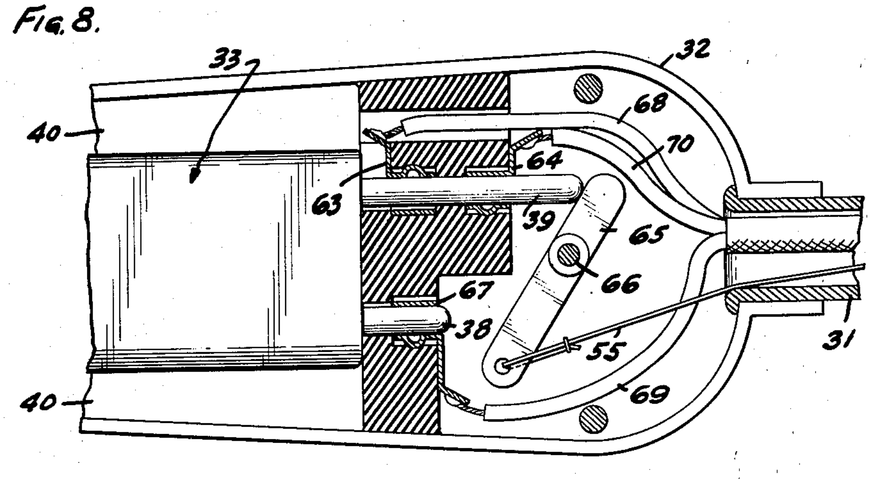
Fig. 8 is an enlarged fragmentary view of the forward portion of the tone arm shown Fig. 1.

Fig. 8 shows the construction in the housing 32 with the pick-up cartridge 33 inserted in position for playing a record at thirty-three and one-third revolutions per minute and a small radius needle 35 positioned for engaging the record and the tone arm suspension adjusted to provide relatively light needle pressure corresponding to the said needle. Upon inserting the cartridge 33 in the above position, the long contact 39 engages terminal clips 63 and 64, which clips are insulated from each other in suitable cavities in the housing 32. Simultaneously a lever 65 pivoted about pin 66 secured in the housing moves cord 55, which is anchored to the long end of the lever 65. The short contact 38 engages with terminal clip 67. Conductors 68 and 69 are connected to clips 63 and 67 respectively and comprise the leads for the electrical sound output of the pick-up. Conductor 70 is connected to clip 64 for the purpose of completing a speed change circuit to be hereinafter described. The above mentioned conductors are intended to be retained in the pick-up arm and run through the bore in the spindle 42 but are omitted for the purpose of clarity in Figs. 4 and 6.

Figure 9:
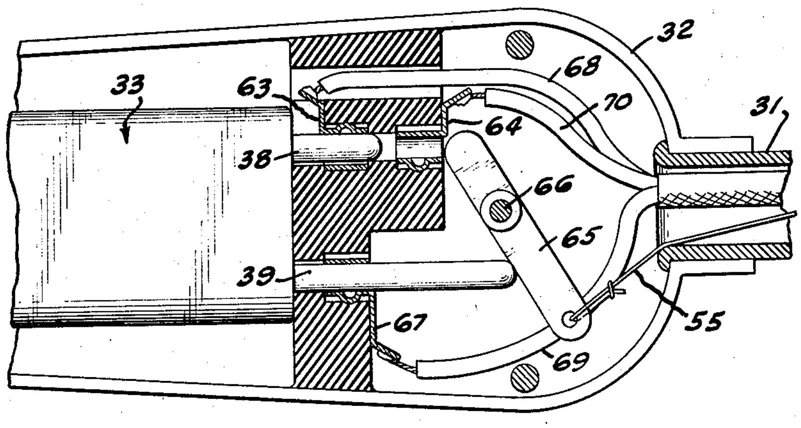
Fig. 9 is the same as Fig. 1 with parts in changed position.

Fig. 9 shows the position of the elements in the housing 32 when the cartridge is inverted with respect to its position in Fig. 8, which positions needle 34 for playing a standard record and by the action of the changed position of lever 65 provides for a predetermined increase in needle pressure and since the short contact 38 does not engage clip 64 a circuit cannot be completed in conductors 68 and 70, which circuit controls the speed of the turntable.

Figure 10:
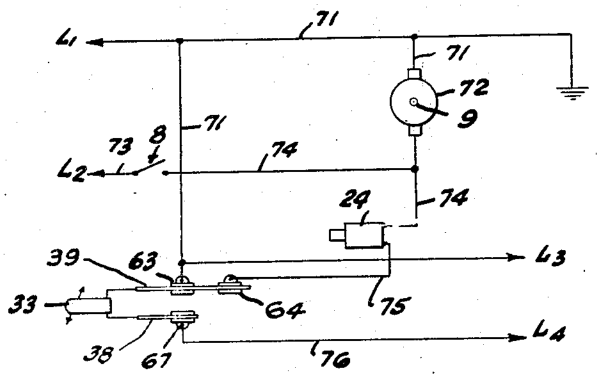
Fig. 10 is a schematic wiring diagram in the record player shown Fig. 1.

Fig. 10 illustrates a typical electric circuit used in connection with the tone arm and turntable. A grounded conductor 71 is connected to one side of a source of electric energy $L_1$ and to one terminal of motor 72 which rotates shaft 9, shown in Fig. 2. Conductor 71 is also connected to terminal clip 63 and to one side of the sound output $L_3$. Conductor 73 is connected to the remaining side of a source of electric energy $L_2$ and to one side of an on-off switch 9. The remaining side of the switch is connected by a conductor 74 to the remaining terminal of the motor 72 and one terminal of electro-magnet 24. The remaining terminal of electro-magnet 24 is connected by conductor 75 to terminal clip 64. The remaining clip 67 is connected by conductor 76 to the remaining sound output terminal $L_4$. The contacts 38 and 39 of the pick-up 33 are shown in position corresponding with that shown in Fig. 8, in which position a circuit to the electro-magnet 24 is established for positioning the turntable drive elements shown in Fig. 2 to rotate the turntable at its slow speed. Thus it is apparent that the simple expedient of manually inverting the pick-up cartridge will automatically present the proper needle and needle pressure and turntable speed for playing either of two types of phonograph records.

It will be apparent to those skilled in the art that mechanical equivalents for the cord 55 and electric equivalents for the switch terminal clips 63 and 64 and 67 are intended to come within the spirit and scope of this invention.

Having described my invention, I claim:

1. In a phonograph adapted to play both predetermined high and predetermined low speed disk records, a turn table, drive means for driving said turn table at either said high or said low speed, electromagnet means connected to said transmission means, means for deenergizng said electromagnet means, means for energizing said electromagnet means, means whereby said transmission means drives said turn table at a high speed when said electromagnet means is deenergized and at low speed when said electromagnet means is energized, a tone arm, a resilient member, means whereby said tone arm is secured to said resilient member, means whereby said member and turn table are supported for rotation about a vertical fixed axis, an electric pick-up, means whereby said electric pick-up is detachably secured in the other end of said tone arm, said pick-up having a first needle for engaging high speed records projecting downwardly from one side thereof and a second needle for engaging low speed records projection upwardly from the other side thereof, contacts of different size extending into said one end of said tone arm, said pick-up having output connections terminating in said contacts, lever means pivotally secured in said one end of said arm, spring suspension means positioned in said other end of said tone arm for counteracting the weight of said tone arm a normal predetermined degree corresponding with said first needle, electric switch means in said arm, means whereby said electric switch means is responsive to the position of said contacts, electric circuit means for connecting said switch means and said electromagnet means with a source of electric energy, means upon the insertion of said pick-up in said arm with said second needle positioned to play said low speed records for moving said lever in said suspension means by one of said contacts to counteract the weight of said tone arm a predetermined degree corresponding with said second needle and for energizing said electro-magnet means to operate said turn table at said low speed, and means upon the insertion of said pick-up in said arm with the first needle positioned to play said high speed records for moving said lever means and said suspension means to counteract the weight of the said tone arm the said normal predetermined degree corresponding with said first needle and for deenergizing said electro-magnet means to operate said turn table at said high speed.

2. In a phonograph adapted to play both predetermined high and predetermined low speed disk records, a turntable, drive means for driving said turntable at either said high or said low speed, a tone arm, a support, means for pivotally securing one end of the tone arm to said support, means whereby said support is journalled for rotation about a vertical fixed axis, an electric pick-up, means for detachably securing said pick-up in the other end of said tone arm, said pick-up having a first needle for engaging high speed records projecting downwardly from one side thereof and a second needle for engaging low speed records projecting upwardly from the other side thereof, contacts of different size extending into said one end of said tone arm, said pick-up having output connections terminating in said contacts, a spring suspension network consisting of means secured in the pick-up end of said tone arm and means positioned in said other end of said tone arm, spring means connected between each means of said spring suspension network, said first of these two means having a displacement means whereby it is responsive to the position of said contacts and whereby it tensions the spring means and counteracts the weight of said tone arm a different predetermined degree corresponding with said second needle when said pick-up is secured with the second needle projecting downwardly.

3. In a phonograph tone arm and support, said support journalled for rotation about a vertical fixed axis, one end of said tone arm being pivotally mounted on said support, lever means, means for pivotally securing said lever means in the other end of said arm, an electric pick-up, said pick-up having contact members of different size, said contacts adapted to be variably positioned in said other end of said arm and alternately engageable with said lever means, spring means for normally urging said tone arm against the action of gravity, said spring having one end connected to said lever means and its opposite end connected to said support, means to adjust the effective weight of said arm, said last named means including pivoting said lever means by varying the position of said contacts whereby the opposite end of said spring is moved toward or away from said vertical axis.

4. In a phonograph adapted to play both predetermined high and predetermined low speed disk records, a turntable, drive means for driving said turntable at either said high or said low speed, a tone arm, a support, means for pivotally securing one end of said arm to said support, means whereby said support is journalled for rotation about a vertical fixed axis, an electric pick-up, means for detachably securing said pick-up in the other end of said tone arm, said pick-up having a first needle for engaging high speed records projecting downwardly from one side thereof and a second needle for engaging said low speed records projecting upwardly from the other side thereof, contacts of different sizes extending into said one end of said tone arm, said pick-up having output connections terminating in said contacts, lever means, means for pivotally securing the lever means in the other end of said arm, a spring retainer member, means for securing said spring retainer member to said support means, a spring suspension network, said spring suspension consisting of means secured in the pick-up end of said tone arm, means positioned in the said other end of said tone arm, a spring means connected between each means of said spring suspension network, said first of these two means having a displacement means whereby it is responsive to the position of said contacts and whereby it tensions the spring means and counteracts the weight of said tone arm a normal predetermined degree corresponding with said first needle when said pick-up is secured with first needle projecting downwardly and for adjusting said lever means for counteracting the weight of said tone arm at a different predetermined degree corresponding with said second needle when said pick-up is secured with the second needle projecting downwardly.

5. In a phonograph adapted to play both predetermined high and predetermined low speed disk records, a turntable, drive means for driving said turntable at either said high or said low speed, a tone arm, a support, means for pivotally securing one end of said arm to said support, means whereby said support is journalled for rotation about a vertical fixed axis, an electric pick-up, said pick-up having a first needle for engaging high speed disk records and a second needle for engaging low speed disk records, said pick-up mounted on said arm, said pick-up having output connections terminating in contacts of different sizes, means for adjusting the effective weight of said arm, said last named means including a spring suspension network secured in the pick-up end of said arm and means positioned in the other end of said arm, spring means connected between each means of said spring suspension network, said first of these two means having displacement means whereby it is responsive to the position of said contacts and whereby it tensions the spring means and counteracts the weight of said tone arm a different predetermined degree corresponding with said second needle when said pick-up is secured with the second needle projecting downwardly.

LLOYD J. ANDRES.

REFERENCES CITED

The following references are of record in the file of this patent:

UNITED STATES PATENTS

| Number | Name | Date |
|---|---|---|
| 1,822,932 | Loughridge | Sept. 15, 1931 |
| 2,069,136 | Durand | Jan. 26, 1937 |
| 2,113,401 | Goldsmith | Apr. 5, 1938 |
| 2,157,065 | Madle | May 2, 1939 |
| 2,222,552 | Dally | Nov. 19, 1940 |
| 2,262,731 | Gruber | Nov. 11, 1941 |
| 2,269,263 | Guedon | Jan. 6, 1942 |
| 2,320,427 | Guedon | June 1, 1943 |
| 2,375,658 | Johnson | May 8, 1945 |
| 2,438,264 | Bender | Mar. 23, 1948 |
| 2,438,265 | Metzner | Mar. 23, 1948 |